Patented Sept. 28, 1926.

1,601,404

UNITED STATES PATENT OFFICE.

MATTHEW D. MANN, JR., OF ROSELLE, AND ROBERT B. LEBO, OF ELIZABETH, NEW JERSEY, ASSIGNORS TO STANDARD DEVELOPMENT COMPANY, A CORPORATION OF DELAWARE.

PURIFYING ALCOHOLS.

No Drawing. Application filed March 6, 1923. Serial No. 623,165.

This invention relates to the purification of alcohols, and will be fully understood from the following description.

In the purification of alcohols, particularly such as are made from hydrocarbons as starting material, it is found that in using hypochlorites or chlorin, there is a tendency toward some attack of the alcohol molecules with formation of chlor-derivatives. To the extent that this occurs, there is a corresponding loss on the yield of refined products. Chlorin being otherwise very efficient, it is accordingly desirable that its action might be so guarded and directed as to avoid unnecessary losses.

In proceeding in accordance with our invention, the alcohol to be purified is treated with chlorin or a hypochlorite or bleaching powder together with a metallic chlorid. The invention may be illustrated by the following examples:—

Example I—To 1000 gallons of isopropyl alcohol, there is added about 40 lbs. of ferric chlorid, and gaseous chlorin is passed into the alcohol to the amount of about 10–30 lbs.

Example II—To 1000 gallons of alcohol, about 40 lbs. of ferric chlorid is added, and a suspension of about 125 lbs. of bleaching power in 200 gallons of water, the bleach being added either all at once or in divided batches.

Example III—To 1000 gallons of alcohol there is added about 50 lbs. of cupric chlorid, and chlorin is passed into the alcohol to the amount of about 10–30 lbs.

We have also used the chlorids of zinc, manganese, tin, lead, nickel, cobalt, in place of the iron or copper chlorids, but regard these latter as ordinarily preferable.

The quantities of the reagents may be varied, depending upon the amount of impurities present. Instead of bleaching powder, sodium hypochlorite solution, containing for instance about 30 lbs. of available chlorin may be used. The hypochlorite may be made by passing chlorin into a 10–20% solution of caustic soda, and leaving an excess of soda over that theoretically required to combine with the chlorin.

After the alcohol has been treated in the manner described it is distilled or fractionated. For products of highest purity it is further treated with caustic soda or a metallic chlorid.

While we have described our invention by reference to certain details, it will be understood that this is for the purpose of illustration, and is not limitative; the scope of the invention being as defined in the following claims, in which it is our intention to claim the subject matter as broadly as the prior art permits.

What we claim is:

1. The process of purifying isopropyl alcohol, which comprises treating the alcohol with about 40 lbs. of ferric chlorid, and about 10–30 lbs. of chlorin per 1000 gallons of alcohol, distilling the alcohol, treating the alcohol with caustic soda and again distilling.

2. The process of purifying alcohols, which comprises treating the alcohol with ferric chlorid and free chlorin, and finally distilling.

3. The process of purifying alcohols, which comprises treating the alcohol with a chlorid of a heavy metal and free chlorin.

MATTHEW D. MANN, JR.
ROBERT B. LEBO.